(12) United States Patent
Uenishi et al.

(10) Patent No.: US 6,379,796 B1
(45) Date of Patent: Apr. 30, 2002

(54) COMPOSITE HOLLOW FIBER MEMBRANE

(75) Inventors: Masamoto Uenishi; Noriaki Fukushima, both of Otake (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/509,878

(22) PCT Filed: Oct. 2, 1998

(86) PCT No.: PCT/JP98/04466

§ 371 Date: May 31, 2000

§ 102(e) Date: May 31, 2000

(87) PCT Pub. No.: WO99/17866

PCT Pub. Date: Apr. 15, 1999

(30) Foreign Application Priority Data

Oct. 2, 1997 (JP) .................................... 9-284297

(51) Int. Cl.$^7$ ................................ D02G 3/00

(52) U.S. Cl. .................... 428/398; 428/375; 428/397

(58) Field of Search ............................. 428/397, 398, 428/375

(56) References Cited

U.S. PATENT DOCUMENTS

| | | | | |
|---|---|---|---|---|
| 4,243,701 A | * | 1/1981 | Riley et al. | 427/244 |
| 4,877,421 A | * | 10/1989 | Bikson et al. | 55/16 |
| 5,049,169 A | * | 9/1991 | Teramoto et al. | 55/158 |
| 5,108,464 A | * | 4/1992 | Friesen et al. | 55/16 |
| 5,972,080 A | * | 10/1999 | Nagata | 96/13 |

FOREIGN PATENT DOCUMENTS

| | | | |
|---|---|---|---|
| JP | 1-127023 | * | 5/1989 |
| JP | 4-215828 | | 8/1992 |
| JP | 6-335623 | | 12/1994 |

\* cited by examiner

*Primary Examiner*—Cynthia H. Kelly
*Assistant Examiner*—J. M. Gray
(74) *Attorney, Agent, or Firm*—Fitch, Even, Tabin & Flannery

(57) ABSTRACT

Disclosed is a composite hollow fiber membrane having a composite structure consisting of a homogeneous thin film interposed between porous substrate layers wherein the ratio of the oxygen permeation flux to the nitrogen permeation flux of the membrane is not less than 1.1 and wherein, after the membrane has been immersed in chemical liquids according to JIS K 7114, the percentage change of the ratio is within ñ10%. This composite hollow fiber membrane can be used to degas chemical liquids without any liquid leakage.

13 Claims, 2 Drawing Sheets

COMPOSITE HOLLOW FIBER MEMBRANE

This application is the national phase of international application PCT/JP98/04466 filed Oct. 2, 1998 which designated the U.S.

TECHNICAL FIELD

This invention relates to hollow fiber membranes for the degassing of chemical liquids and, more particularly, to composite hollow fiber membranes for the degassing of chemical liquids for use in semiconductor fabrication processes (e.g., photoresist solutions, developing solutions, and chemical liquids for use in a spin-on-glass process), inks for ink-jet printers, liquid crystals and organic solvents.

BACKGROUND ART

With respect to high-purity water for use in semiconductor fabrication, water drained from boilers, and the water supply lines of buildings, raw water containing dissolved oxygen in a saturated state tends to be responsible for oxidation. Accordingly, Japanese Patent Laid-Open No. 169303/'91 discloses a technique for reducing the dissolved oxygen concentration by removing dissolved oxygen from such raw water with the aid of a hollow fiber membrane. In this patent, there is used a three-layer composite hollow fiber membrane in which a homogeneous film consisting of a thin silicone rubber film, silicone-polycarbonate copolymer, poly (4-methylpentene-1), perfluoroalkyl polymer or segmented polyurethane is interposed between porous films.

Water-containing chemical liquids include semiconductor developing solutions, inks for ink-jet printers, alcohol-water mixtures and the like. In the case of such chemical liquids, they are sometimes used at a temperature lower than 30° C. so that their gas solubilities may be reduced to the utmost. The reasons why this method of use is employed are that, since water tends to have lower gas solubilities than organic solvent over a wide temperature range, the use of a water-based solution is suitable for the purpose of reducing dissolved gas concentrations, and that the gas solubilities become lower as the temperature of the solution is reduced.

However, when the method described in the aforementioned patent is applied to water-containing chemical liquids, the following problems arise. In the case of a hollow fiber membrane in which a thin silicone rubber film, silicone-polycarbonate copolymer, perfluoroalkyl polymer or segmented polyurethane is used as the homogeneous film, it has not only high oxygen and nitrogen permeation fluxes, but also a high water vapor permeation flux. Consequently, during the course of degassing, condensation causes water-drops to be formed on the opposite surface of the membrane. This is the same situation as the leakage of raw water to the opposide surface. Moreover, the membrane swells severely with alcohols, ethers, ketones and esters contained in chemical liquids, so that the thin film may be broken or a large amount of solvent vapor may be discharged to the secondary side (or evacuated side) of the membrane. In the case of a hollow fiber membrane using poly(4-methylpentene-1), this membrane material has its glass transition region in the vicinity of 30° C. and hence becomes brittle in water having a temperature lower than 30° C. Consequently, the membrane tends to be broken by the action of external pressure and cause the leakage of raw water to the opposite surface.

In semiconductor fabrication processes, defects such as processing spots may be produced owing to gas bubbles introduced into the supplied chemical liquids. For example, in the lithographic process in which a thin film overlying a semiconductor wafer is patterned by coating with a photoresist solution, exposure to light through a pattern-bearing mask, development and etching, troubles such as poor patterning due to processing spots may be developed when the semiconductor wafer is spin-coated with a photoresist solution or developing solution having gas bubbles introduced thereinto. Moreover, when gas bubbles are introduced into the washing fluid used in the washing operations of the lithographic process, washing spots may be produced.

The cause for the introduction of gas bubbles is believed to be as follows. A chemical liquid is delivered to a discharge nozzle with the aid of nitrogen gas. When the chemical liquid is discharged from the nozzle, the pressure applied to the chemical liquid is returned to atmospheric pressure. As a result, the dissolved gas present therein becomes supersaturated and this supersaturated fraction forms gas bubbles. The formation of gas bubbles can be minimized by reducing the dissolved gas concentration in the chemical liquid delivery step according to a technique such as membrane degassing.

As techniques for removing dissolved gases from chemical liquids by use of a membrane, the following methods have been known.

(1) a method for removing dissolved nitrogen from a chemical liquid by use of a porous hollow fiber membrane having intercommunicating pores from the inner surface to the outer surface (Japanese Patent Laid-Open Nos. 243306/'96, 94447/'97, 7936/'97, 199607/'89 and 7915/'89; Japanese Patent Publication Nos. 57478/'93 and 45282/'93; and the like).

(2) a method for removing dissolved nitrogen from a chemical liquid by use of a heterogeneous hollow fiber membrane in which a homogeneous thin film layer (i.e., a thin film layer free of intercommunicating pores) is disposed on the surface and supported by a porous substrate layer formed from the same polymer as the homogeneous thin film layer (Japanese Patent Laid-Open Nos. 94447/'97, 187629/'97 and 278897/'94; and the like).

(3) a method for removing dissolved nitrogen from a chemical liquid by use of a non-porous (homogeneous) tubular membrane prepared by forming a tetrafluoroethylene resin having excellent solvent resistance into tubes (Japanese Patent Laid-Open Nos. 153675/'97, 243306/'97, 7936/'97, 267149/'93, 31804/'95, 57008/ '97 and 124875/'96; Japanese Utility Model Laid-Open No. 9160/'90; and the like).

(4) a method for removing dissolved nitrogen from a chemical liquid by use of a two-layer composite hollow fiber membrane comprising a homogeneous thin film laminated onto a porous substrate layer (Japanese Utility Model Laid-Open No. 91601/'90; and Japanese Patent Laid-Open Nos. 243306/'97, 94447/'97 and 68007/'89).

(5) a method for removing dissolved nitrogen from a chemical liquid by use of a three-layer composite hollow fiber membrane prepared by interposing a non-porous film comprising a fluororesin between porous substrate layers comprising a fluororesin, and adhesive-bonding the layers with together to form an integral structure (Japanese Patent Laid-Open No. 63007/'89).

However, in the method (1), successful degassing cannot be achieved if the membrane material is highly wettable by the chemical liquid. Specifically, when the liquid being treated is fed to the primary side of the membrane, the liquid being treated penetrates into the pores and leaks out to the secondary side (i.e., the opposite side) of the membrane. This phenomenon is noticeable especially when the chemical liquid comprises a chemical liquid for use with semiconductors or an ink for ink-jet printers.

In the method (2), it is difficult to disturb the crystalline orientation of the homogeneous thin film layer perfectly in the spinning step, so that an ordered structure based on crystalline orientation is created to some extent. As a result, intercommunicating pores tend to be formed in the homogeneous thin film layer during the course of the drawing step for forming a porous layer. Moreover, during handling of the prepared membrane, mechanical rubbing tends to produce pinholes in the homogeneous thin film layer. With this membrane, therefore, successful degassing cannot be achieved because the liquid being treated penetrates into the pores of the porous layer and then leaks out through the pores or pinholes of the homogeneous thin film layer. Such leakage of the chemical liquid is noticeable especially when the chemical liquid comprises a chemical liquid for use with semiconductors or an ink for ink-jet printers.

In the method (3), not only the membrane material has a low nitrogen permeability coefficient, but also the tubes used for degassing purposes have a large membrane thickness. Consequently, the nitrogen permeation flux is low [e.g., nitrogen permeation flux=$0.5 \times 10^{-11}$ cm$^3$/(cm$^2$·Pa ·sec)], so that degassing causes the dissolved gas concentration to be reduced only to about 90% of its saturated concentration. This degassed level is insufficient for practical purposes.

In the method (4), both the homogeneous thin film material and the porous substrate material have solvent resistance and are hence chemically inert, so that it is difficult to bond both layers with an adhesive. Accordingly, both layers are integrally bonded by fusion, but the fusing step tends to produce pinholes in the homogeneous thin film. When pinholes are produced, satisfactory degassing cannot be achieve because the liquid being treated leaks out through the pinholes.

In the method (5), the thickness of the non-porous film is enlarged by the thicknesses of the adhesive layers, resulting in an increase in resistance to gas permeation. Consequently, the fluxes of the gases passing through the thin film are substantially reduced and, therefore, degassing capability tends to be insufficient for practical purposes.

With regard to the liquid crystal sealing process, techniques for removing dissolved gases or gas bubbles present in a liquid crystal by means of a vacuum pump are disclosed in Japanese Patent Laid-Open Nos. 170932/'98 and 218921/'95. To this process, the same techniques as described above in connection-with the degassing of chemical liquids for use in semiconductor fabrication processes are also applicable, but still involve the same problems.

In ink-jet printers having a piezoelectric element head, the piezoelectric element of the head repeats pressurization and depressurization many times during ink discharge. It is known that, during this process, dissolved gases (e.g. dissolve oxygen and nitrogen) present in the ink contained in the head grow to gas bubbles, which tend to stay in the piezoelectric element head. These gas bubbles may be discharged together with the ink to cause print dot losses. On the other hand, in ink-jet printers having a thermal head, it is known that, as a result of thermal cycles for heating or cooling the ink rapidly, dissolved gases present in the ink grow to gas bubbles during head operation. Since these gas bubbles tend to stay in the thermal head, they may be discharged together with the ink to cause print dot losses.

As a technique for removing dissolved gases from an ink by means of a membrane, Japanese Patent Publication No. 37173/'95 discloses a method for removing dissolved gases present in an ink through a plain-film partition positioned in the ink discharge head unit so as to separate an evacuated space from an ink-filled space. However, since the head unit of an ink-jet printer must be rapidly operated, there is a limit to the area of the membrane which can be mounted in the head. Since the membrane materials described therein have oxygen and nitrogen permeation fluxes of as low as about 1 to $3 \times 10^{-10}$ cm$^3$/(cm$^2$·Pa·sec), it is difficult to remove dissolved gases to a sufficient extent.

Moreover, Japanese Patent Laid-Open No. 17712/'93 discloses a method for removing dissolved gases present in an ink selectively through a hollow fiber membrane by feeding a raw ink to the inside of the membrane and evacuating the outside of the membrane. However, the tetrafluoroethylene tubes used in the examples of this patent have a very small membrane thickness of 1 to 2 $\mu$m. When a raw ink is made to flow on the inside of the membrane, the flow of the ink causes the membrane to expand outwardly. Since the membrane thickness is very small relative to this force and hence has insufficient mechanical strength, there is a strong possibility that the membrane may be broken to cause leakage of the liquid being treated.

DISCLOSURE OF THE INVENTION

An object of the present invention is to provide a degassing membrane which has sufficiently high oxygen and nitrogen permeation fluxes and a low water vapor permeation flux, and can be used to degas chemical liquids without any liquid leakage.

That is, the present invention provides a composite hollow fiber membrane having a composite structure consisting of a homogeneous thin film interposed between porous substrate layers wherein the ratio of the oxygen permeation flux to the nitrogen permeation flux of the membrane is not less than 1.1 and wherein, after the membrane has been immersed in chemical liquids according to JIS K 7114, the percentage change of the ratio is within ±10%.

It is preferable that, after this composite hollow fiber membrane has been immersed in chemical liquids according to JIS K 7114, the percentage change in weight of the membrane is in the range of 0 to +30%. It is also preferable that this hollow fiber membrane has a nitrogen permeation flux of not less than $0.5 \times 10^{-9}$ cm$^3$/(cm$^2$·Pa·sec) and an oxygen permeation flux of not less than $0.6 \times 10^{-9}$ cm$^3$/(cm$^2$·Pa·sec).

In the present invention, the chemical liquid immersion test according to JIS K 7114 is carried out by using five types of chemical liquids including isopropyl alcohol, a semiconductor developing solution, a spin-on-glass solution, an ink for ink-jet printers, and a liquid crystal. For this testing purpose, a 2 wt % aqueous solution of tetramethylammonium hydroxide is used as the semiconductor developing solution, a mixture composed of 70% by weight of isopropyl alcohol, 2% by weight of tetraethoxysilane, and 28% by weight of water as the spin-on-glass solution, a dye-based ink containing a solvent composed of 80% by weight of water, 5% by weight of ethylene glycol, and 15% by weight of isopropyl alcohol as the ink for ink-jet printers, and cholesterin chloride cholesterin nonanoate as the liquid crystal.

BEST MODE FOR CARRYING OUT THE INVENTION

Figure 1:
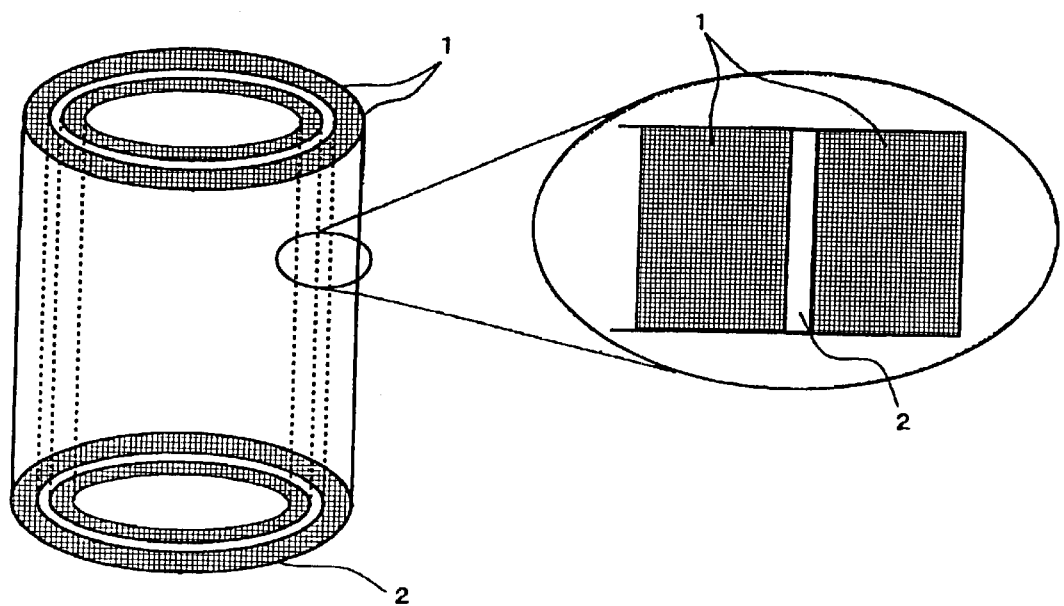
FIG. 1 is a schematic view of a composite hollow fiber membrane in accordance with the present invention.

The composite hollow fiber membrane of the present invention has a structure in which a homogeneous thin film free of pinholes or micropores is interposed between porous substrate layers disposed on both sides of the thin film, without being bonded to the substrate layers. Accordingly, this membrane does not cause the leakage of chemical liquids through the pores, as contrasted with membranes consisting entirely of a porous layer. Moreover, unlike heterogeneous membranes, mechanical rubbing does not produce pinholes because the homogeneous thin film is not disposed on the outside of the membrane. In spite of the fact that the porous substrate layers and the homogeneous thin film constituting the composite hollow fiber membrane of the present invention are arranged in mere contact with each other, this composite membrane can retain its form stably even if it is used for the degassing of a chemical liquid. It is undesirable to dispose an adhesive between the porous substrate layers and the homogeneous thin film, because the adhesive layer tends to cause a reduction in gas permeability which, in turn, causes a reduction in degassing capability. It is also undesirable to integrally bond the homogeneous thin film and the porous substrate layers by heat fusion without using an adhesive, because local heating will melt a portion of the thin film to produce micropores and the chemical liquid being degassed may leak through these micropores.

In the present invention, the chemical resistance of a composite hollow fiber membrane is evaluated by immersing the membrane in chemical liquids according to the procedure (i.e., immersion at 20° C. for 7 days) described in JIS K 7114, and determining the indices defined by the following equations (1) and (2).

$$\text{Change in permeation flux ratio of membrane} = \frac{(\text{Permeation flux ratio after immersion}) - (\text{Permeation flux ratio before immersion})}{\text{Permeation flux ratio before immersion}} \times 100 \quad \text{(Equation 1)}$$

Permeation flux ratio=(Oxygen permeation flux)/(Nitrogen permeation flux)

$$\text{Percentage change in weight of membrane (\%)} = \frac{(\text{Weight of composite hollow fiber membrane after immersion}) - (\text{Weight of composite hollow fiber membrane before immersion})}{\text{Weight of composite hollow fiber membrane before immersion}} \times 100 \quad \text{(Equation 2)}$$

As used herein, the gas permeation fluxes are values obtained by supplying pure oxygen or nitrogen to the membrane and measuring its permeation flux according to ASTM D 1434.

The composite hollow fiber membrane of the present invention is characterized in that the permeation flux ratio, defined as the ratio of oxygen permeation flux to nitrogen permeation flux, is not less than 1.1 and in that, after the membrane has been immersed in chemical liquids according to JIS K 7114, the percentage change of the ratio, as defined by equation (1), is within ±10%. If the permeation flux ratio is not less than 1.1, the membrane can exhibit degassing capability suitable for use in practical applications. However, if the permeation flux ratio is less than 1.1, this represents the fact that pinholes have already been formed in a portion of the membrane. In particular, values less than 0.93 indicate that pinholes having a size close to the mean free paths of oxygen and nitrogen molecules are formed in the entire homogeneous thin film. This is undesirable in that chemical liquids tend to leak through these pinholes. Moreover, if the percentage change in permeation flux ratio after immersion, as defined by equation (1), is within ±10%, the homogeneous thin film has sufficient durability for chemical liquids. On the other hand, if the percentage change is a decrease greater than −10%, the homogeneous thin film will have pinholes formed therein, and if the percentage change is an increase greater than +10%, the homogeneous thin film will show a reduction in mechanical strength due to swelling or cause solvent vapors to be discharged to the secondary side of the membrane.

The materials which can be used as the porous substrate layers constituting the composite hollow fiber membrane of the present invention include polyolefins (in particular, polyethylene and polypropylene), poly(4-methylpentene-1), polyvinylidene fluoride and polyoxymethylene. These polymers have high chemical resistance to the chemical liquid which are intended to be treated with the composite hollow fiber membrane of the present invention, and their changes in weight are approximately zero.

The percentage change in weight, as defined by equation (2), of the composite hollow fiber membrane of the present invention substantially represents a change in weight of the homogeneous thin film. If its value is in the range of 0 to +30%, the membrane undergoes no pinhole production due to swelling and retains mechanical strength sufficient for practical use, so that no leakage of the chemical liquid occurs. If the percentage change in weight is less than 0%, this corresponds to an undesirable situation in which the membrane is dissolved to produce pinholes and thereby cause leakage of the chemical liquid. If the percentage change in weight is greater than +30%, the degree of swelling of the membrane is so high that its mechanical strength will be reduced and the membrane may be broken after long-time degassing operation.

When a chemical liquid is degassed to remove dissolved nitrogen gas and oxygen gas therefrom, the ultimate degassed level must generally be such that the dissolved nitrogen gas and oxygen gas concentrations in the degassed chemical liquid are not greater than 50% of the solubilities of oxygen and nitrogen under atmospheric pressure. If this ultimate level is not attained, the degassed level will be insufficient because dissolved gasses present in the chemical liquid tend to form gas bubbles when the chemical liquid is subjected to another vacuum step. Especially in the case of inks for ink-jet printers, a particularly high degassed level may be required to prevent print dot losses. In such a case, it is preferable that the ultimate degassed level be not greater than 10% of the solubilities under atmospheric pressure. It has been found that, in order to degas chemical liquids to such a practically sufficient level, the hollow fiber membrane must have a nitrogen permeation flux of not less than $0.5 \times 10^{-9}$ cm$^3$/(cm$^2$·Pa·sec) and an oxygen permeation flux of not less than $0.6 \times 10^{-9}$ cm$^3$/(cm$^2$·Pa·sec). If the oxygen and nitrogen permeation fluxes are less than the aforesaid values, the desired ultimate degassed level cannot be attained.

Where a membrane is used to remove dissolved gases from a water-containing chemical liquid, water vapor having passed through the membrane is delivered to the vacuum pump, provided that the membrane has a high water vapor permeation flux. When the vacuum pump comprises an oil diffusion pump, rotary pump or the like, the introduction of water vapor into the pump tends to cause a failure thereof. Moreover, this is also undesirable from a hygienic point of view in that water vapor having passed through the membrane condenses on the secondary surface of the membrane and the resulting condensate promotes the growth of microorganisms such as mold. Thus, a membrane having a high water vapor permeation flux is not suitable for the degassing of water-containing chemical liquids. As a result of investigation by the present inventors, it has been found that, in order to avoid the above-described disadvantages, the membrane should preferably have a water vapor permeation flux of not greater than $1 \times 10^{-2}$ g·m/(m$^2$·day). As used herein, the water vapor permeation flux is a value obtained according to ASTM E 96, i.e., by supplying air at 25° C. and 70% RH to a membrane, evaluating the opposite side of the membrane to 10 KPa, collecting water vapor having passed through the membrane by means of a cold trap, converting the amount of collected water to a value per unit membrane area per day, and multiplying this value by the thickness of the membrane. For the materials which may be used as the homogeneous thin film in the practice of the present invention and will be described later, their water vapor permeation fluxes are not greater than $1 \times 10^{-2}$ g·m/(m$^2$·day).

The thickness of the homogeneous thin film is preferably in the range of 1 to 10 $\mu$m. If its thickness is less than 1 $\mu$m, the membrane will have insufficient pressure resistance in practical use. Preferably, the polyolefin porous substrate layers each have a thickness of 10 to 50 $\mu$m and a porosity of 10 to 50 vol %. In the present invention, one or more porous substrate layers are disposed on either side of the homogeneous thin film. In order to enhance the mechanical strength of the membrane, it is more preferable to dispose two or more porous substrate layers on each side of the homogeneous thin film. If thickness of each porous substrate layer is less than 10 $\mu$m, the membrane will have insufficient mechanical strength, If the total thickness of the porous substrate layers disposed on each side of the homogeneous thin film is greater than 200 $\mu$m, hollow fibers comprising the hollow fiber membrane have an unduly large outer diameter and, when they are fabricated into a module, the volumetric efficiency of the membrane will be unduly low.

The composite hollow fiber membrane of the present invention may be prepared by the step of carrying out multilayer composite spinning and the step of drawing the spun fiber to make it porous. Specifically, using a spinning nozzle, for example, of concentric composite structure, a molten polymer for the formation of a substrate layer precursor (i.e., an undrawn layer) is fed to the outermost-layer and innermost-layer parts of the nozzle, and a molten polymer for the formation of a homogeneous film is fed to the intermediate-layer part of the nozzle. Thus, these molten polymers are extruded through the concentric nozzle and cooled under drafted conditions to solidify the molten polymers and thereby form an undrawn hollow fiber. Subsequently, the undrawn hollow fiber is drawn so as to make the outer-layer portion thereof porous. Although the draw ratio may vary according to the types of the polymers used, it is usually in the range of 2 to 10 based on the length of the undrawn fiber. If the draw ratio is less than 2, the porosity of the porous substrate layers will become lower than the aforesaid lower limit and make it difficult to achieve sufficient gas permeability. If the draw ratio is greater than 10, the breaking elongation of the composite hollow fiber membrane will be so low as to cause a problem from a practical point of view.

It has been found that, as the material of the homogeneous thin film constituting in the composite hollow fiber membrane of the present invention, the following five types of thermoplastic polymers may preferably be used. These polymers are described below in order.

A first material suitable for use as the homogeneous film is a polymer blend composed of a styrene-based thermoplastic elastomer and a polyolefin. Such a polymer blend composed of a styrene-based thermoplastic elastomer and a polyolefin can be formed into a homogeneous thin film having a thickness of not greater than 10 $\mu$m, and this film has excellent chemical resistance to various chemical liquids and can hence be used to remove dissolved gases to a practically useful ultimate degassed level. The gas permeability coefficients and gas permeation fluxes given below are values obtained by supplying pure oxygen and nitrogen to the film and measuring their permeation fluxes according to ASTM D 1434. The density is a value obtained by melting the polymer at 190° C., extruding it under a load of 2.16 kg to form a strand, cooling it slowly to room temperature, and measuring this sample in a density gradient tube according to ASTM D 1505.

The styrene-based thermoplastic elastomer used in the present invention may be suitably selected from the following two structures.

A) A block copolymer in which the hard segments comprise a styrene polymer and the soft segments comprise a polymer derived from at least one monomer selected from butadiene, ethylene-butylene., isoprene and ethylene-propylene.

B) A random copolymer composed of two or more types of constitutional units formed from styrene and at least one of butadiene, ethylene-butylene, isoprene and ethylene-propylene.

Such styrene-based thermoplastic elastomers have oxygen and nitrogen permeability coefficients in the range of $0.6 \times 10^{-13}$ to $3 \times 10^{-12}$ cm(STP)$^3$·cm·cm$^{-2}$·sec$^{-1}$·Pa$^{-1}$. In order to obtain a homogeneous thin film having the desired oxygen and nitrogen permeation fluxes, they need to be formed into a film having a thickness of 10 to 1 $\mu$m. However, the styrene-based thermoplastic elastomers have high melt viscosity, which makes it difficult to use them alone for the formation of a thin film. On the other hand, a polymer blend composed of a styrene-based thermoplastic elastomer and a polyolefin (hereinafter referred to briefly as a polyolefin/styrene-based thermoplastic elastomer) has lower melt viscosity than the styrene-based thermoplastic elastomer and can hence be formed into a thin film.

When a styrene-based thermoplastic elastomor is melt-blended with a polyolefin, its gas permeability coefficients tend to be reduced. However, it has been found that melt blending with a polyolefin having a density of not greater than 0.900 g/cm$^3$ can yield a polymer blend without causing a reduction in gas permeability coefficients. The polymer blend obtained by such melt blending has oxygen and nitrogen permeability coefficients in the range of $6 \times 10^{-13}$ to $3 \times 10^{-12}$ cm(STP)$^3$·cm·cm$^{-2}$·sec$^{-1}$·Pa$_{-1}$ and can be formed into a thin film according to a melt spinning process. Actually, a thin film having a thickness of 5 to 1 $\mu$m could be obtained. This thin film had oxygen and nitrogen permeation fluxes in the range of $0.6 \times 10^{-9}$ to $3 \times 10^{-8}$ cm(STP)$^3 \cdot$cm$^{-2} \cdot$sec$^{-1} \cdot$Pa$^{-1}$, and could meet the requirement that the ratio of oxygen permeation flux to nitrogen permeation flux be not less than 1.1.

In order to achieve chemical resistance to various chemical liquids, it is effective to create an IPN (Interpenetrating Polymer Network) structure by melt-blending a styrene-based thermoplastic elastomer with a polyolefin. In this structure, the molecular chains of the styrene-based thermoplastic elastomer (i.e., the molecular chains having a physical crosslinking point in a styrene domain) and the molecular chains of the polyolefin (i.e., the molecular chains having a physical crosslinking point in a crystalline region) interpenetrate with each other. It is believed that, owing to this interpenetrating configuration of the three-dimensional network structure, the polymer blend has interstices formed between molecular chains so as to allow gas molecules to pass therethrough while suppressing its dissolution or swelling in chemical liquids. Such a structure can be obtained when the mixing ratio of the styrene-based thermoplastic elastomer to the polyolefin is in the range of 5/95 to 95/5 (by weight). With this polymer blend, it is preferable that its molecular chain structure is an IPN structure, though it depends upon the type of the chemical liquid to be degassed. However, if more importance is attached to gas permeability than to chemical resistance, the molecular chain structure of the polymer blend may be altered to a non-IPN structure.

Although the polymer blend thin film of the present invention has excellent chemical resistance owing to its above-described structure, its chemical resistance is poor with respect to solvents (e.g., hydrocarbons) having strong power to dissolve the styrene-based thermoplastic elastomer. However, its chemical resistance is excellent with respect to ethers, ketones and alcohols, and there is no risk of producing pinholes during use in practical applications.

Where the aforesaid block copolymer (A) is used as the styrene-based thermoplastic elastomer, the temperature dependence of the storage elastic modulus of this block copolymer is such that glass transition based on the structural relaxation of styrene segments is observed in the vicinity of 100° C. and glass transition based on the structural relaxation of soft segments is observed in the vicinity of −50 to −70° C. On the other hand, the temperature dependence of the storage elastic modulus of the random copolymer (B) is such that no clear glass transition point is not observed. In the temperature range of −50 to 50° C., this random copolymer is more flexible than the aforesaid block copolymer (A), and the same is true of thin films. However, this random copolymer does not have a domain structure comprising styrene segments having a well-defined crosslinking point and, therefore, is somewhat inferior in resistance to burst by external pressure.

However, in either (A) or (B), when the thickness of the thin film is in the range of 5 to 1.0 μm, the temperature dependence of its elastic modulus is gentle in the temperature range of −50 to 50° C. in which the degassing operation for removing dissolved gases is carried out. Thus, the thin film has flexibility over a wide temperature range, has a practically sufficient burst strength against external pressure, and is hence suitable for use as a thin film for degassing purposes.

Moreover, the homogeneous thin film comprising the "polyolefin/styrene-based thermoplastic elastomer" also has low water vapor permeability and is hence excellent in that, when it is used to remove dissolved gases from a water-containing chemical liquid, the load imposed on the vacuum pump connected to the secondary side of the membrane is reduced.

Specific examples of the styrene-based thermoplastic elastomer include Kraton commercially available from Shell Chemical Co. (U.S.A.), which is a block copolymer having hard segments formed from a styrene polymer and soft segments formed from a butadiene polymer or an ethylene-butylene copolymer; and Califlex TR commercially available from the same company, which is a block copolymer having soft segments formed from isoprene or ethylene-propylene. Specific examples of the random copolymer include HSBR1320P and HSBR1320P (manufactured by Japan Synthetic Rubber Co., Ltd.) which are random copolymers of styrene and ethylene-butylene.

On the other hand, the polyolefin preferably has a density of not greater than 0.900 g/cm$^3$. Specific examples of such polyolefins include atactic polypropylene, low-density polyethylene, ethylene-propylene copolymers and ethylene-octene copolymers (e.g., one commercially available from Du Pont-Dow Elastomer Co. under the trade name of "ENGAGE").

The above-described styrene-based thermoplastic elastomer and polypropylene are melt-blended by means of a twin-screw extruder. The extruded strands are solidified by cooling, and then pelletized to obtain a resin material for the formation of a homogeneous thin film. Commercially available polymer blends composed of a styrene-based thermoplastic elastomer and a polyolefin include, for example, DYNARON H4800N and DYNARON H4900N [manufactured by Japan Synthetic Rubber Co., Ltd. (JSR Co.)]; and MK Resins such as MK-1, MK-2, MK-3 and MK-5 (manufactured by Dai Nippon Plastics Co., Ltd).

In this case, the material for use as the porous substrate layers may be suitably selected from among high-density polyethylene, isotactic polypropylene, polyoxymethylene, highly crystalline poly(4-methylpentene-1) and the like.

A second material suitable for use as the homogeneous film is a copolymer of (2,2-bistrifluoromethyl-4,5-difluoro-1,3-dioxole) and tetrafluoroethylene. This polymer is in a glassy state at room temperature, but can be melt-spun. When the mixing ratio of (2,2-bistrifluoromethyl-4,5-difluoro-1,3-dioxole) to tetrafluoroethylene is in the range of 50/50 to 90/10 (mole %) and the thickness of the thin film is in the range of 0.5 to 5 μm, the thin film has a nitrogen permeation flux of not less than $0.5 \times 10^{-9}$ cm$^3$/(cm$^2 \cdot$Pa$\cdot$sec) and an oxygen permeation flux of not less than $0.6 \times 10^{-9}$ cm$^3$/(cm$^2 \cdot$Pa$\cdot$sec). If the copolymerization ratio is less than 50/50, the resulting thin film will have unduly low gas permeability. If the copolymerization ratio is greater than 90/10, the resulting thin film will tend to be brittle at room temperature and hence lack practical utility. If the film thickness is less than the aforesaid range, the thin film will tend to be broken during handling or produce pinholes. If the film thickness is greater than the aforesaid range, the thin film will tend to have a nitrogen permeation flux of less than $0.5 \times 10^{-9}$ cm$^3$/(cm$^2 \cdot$Pa$\cdot$sec). In this case, the material for use as the porous substrate layers may be suitably selected from among poly(4-methylpentene-1), polypropylene, polyvinylidene fluoride and the like.

A third material suitable for use as the homogeneous film is a fluorine-containing thermoplastic elastomer. As used herein, the fluorine-containing thermoplastic elastomer is a polymer having hard segments formed from a fluororesin and soft segments formed from a fluororubber. Examples of the fluororesin forming hard segments include an ethylene-tetrafluoroethylene copolymer and polyvinylidene fluoride. Examples of the fluororubber forming soft segments include a vinylidene fluoride-hexafluoropropylene copolymer and a vinylidene fluoride-hexafluoropropylenetetrafluoroethylene terpolymer. The fluorine-containing thermoplastic elastomer preferably has a glass transition temperature in the range of −20 to −10° C. Specific examples of the fluorine-containing thermoplastic elastomer include Dalel Thermoplastic (manufactured by Daikin Industries, Ltd.; a polymer having hard segments formed from an ethylene-tetrafluoroethylene copolymer and soft segments formed from a vinylidene fluoride-hexafluoropropylene copolymer). In this case, the material for use as the porous substrate layers may be suitably selected from among highly stereoregular polypropylene, highly crystalline poly(4-methylpentene-1), polyvinylidene fluoride and the like.

A fourth material suitable for use as the homogeneous film is low-crystalline poly(4-methylpentene-1). The low-crystalline poly(4-methylpentene-1) is a copolymer of poly (4-methylpentene-1) and a higher olefin (e.g., an a-olefin such as octene). Specific examples thereof include TPX MX001 (manufactured by Mitsui Chemical Co., Ltd). In this homogeneous thin film, it is important to keep its degree of crystallinity low. It is desirable that the degree of crystallinity be not greater than 60%. If the degree of crystallinity is greater than 60%, the resulting thin film will have insufficient gas permeability. In this case, the material for use as the porous substrate layers may be suitably selected from among highly crystalline poly(4-methylpentene-1) homopolymer, a highly crystalline (4-methylpentene-1)-(α-olefin) copolymer [e.g., TPX RT31 (manufactured by Mitsui Chemical Co., Ltd.)], polyvinylidene fluoride and the like.

A fifth material suitable for use as the homogeneous film is a polyolefin type thermoplastic elastomer. As used herein, the polyolefin type thermoplastic elastomer is a copolymer composed entirely of polyolefins. Such copolymers include copolymers composed of ethylene or propylene and a higher olefin, such as an ethylene-octene copolymer, a propylene-octene copolymer and an ethylene-propylene copolymer. In order to obtain a thin film having high gas permeability, it is suitable to use such a polymer having a density of not greater than 0.900 g/cm$^3$ at 25° C. Specific examples of the polyolefin type thermoplastic elastomer include commercially available polymers such as Toughmer XR106L and XR107L (propylene-α-olefin copolymers) and PO680 (ethylene-α-olefin copolymer), manufactured by Mitsui Chemical Co., Ltd. In this case, the material for use as the formation of porous substrate layers may be suitably selected from among high-density polyethylene, highly stereoregular polypropylene, polyoxymethylene and the like.

Among the above-described materials for use as the homogeneous film, a polymer material composed of a styrene-based thermoplastic elastomer and a polyolefin, a fluorine-containing thermoplastic elastomer or a polyolefin type thermoplastic elastomer is preferably used especially for the purpose of degassing water-containing chemical liquids. In the above-described polymer materials composed of a styrene-based thermoplastic elastomer and a polyolefin, the glass transition region of the soft segments lies in the range of −50 to +5° C., or no well-defined glass transition region exists. In the fluorine-containing thermoplastic elastomers, the glass transition region lies in the range of −20 to −10° C. In the polyolefin type thermoplastic elastomers, the glass transition region lies in the range of −70 to −10° C. Thus, the glass transition region lies in such a low temperature range that the homogeneous film is not easily broken even if water-containing chemical liquids are degassed at low temperatures.

The chemical liquids which are intended to be degassed by use of the composite hollow fiber membrane of the present invention include organic solvents such as methanol, ethanol, isopropyl alcohol, butanol, methyl ethyl ketone, ethyl cellosolve, ethyl lactate and propylene glycol monomethyl ether acetate; chemical amplification type positive photoresist solutions; naphthoquinone diazide type positive photoresists; a semiconductor developing solution comprising tetramethylammonium hydroxide dissolved in water; dye-based inks for ink-jet printers; pigment-based inks for ink-jet printers; and liquid crystals. The chemical amplification type positive photoresist solutions are solutions prepared by dissolving a methacrylate resin having alicyclic adamantyl groups and cyclic ketone (oxocyclohexyl) groups as side chains, a copolymer of mevalolactone methacrylate and methyladamantyl methacrylate, or the like in ethyl lactate and propylene glycol monomethyl ether acetate. The naphthoquinone diazide type positive photoresists are solutions prepared by dissolving a naphthoquinone diazide-based polymer in ethyl lactate and propylene glycol monomethyl ether acetate. The inks for ink-jet printers are solutions prepared by dissolving a dye or pigment in a solvent mixture composed of water, ethylene glycol, isopropyl alcohol, methyl ethyl ketone and the like. The liquid crystals include chelesteric liquid,crystals, and one specific example thereof is cholesterin chloride cholesterin nonanoate.

The solubilities of oxygen and nitrogen in various chemical liquids as described above are shown in Table 1. The data shown in this table are based on values described in "Kagaku Benran" (Maruzen) and values measured by the present inventors. Measurements were made by gas chromatographic analysis. The dissolved gas concentrations described in the examples given herein were also measured by gas chromatographic analysis.

TABLE 1

| | | | | | | | | | PEGMEA* (solvent for chemical amplification type positive resists) (used in Example 1) | Resist developing solution MF-321 (used in Example 2) | Spin-on-glass solution (used in Example 4) | Ink for ink-jet printer cartridges (used in Example 5) |
|---|---|---|---|---|---|---|---|---|---|---|---|---|
| | Methanol | Isopropyl alcohol (used in Example 3) | Ethanol | 1-Butanol | N,N-dimethylformamide | Acetone | Methyl acetate | Diethyl ether | | | | | ppm [dissolved gas weight (g)/solvent weight (g)]

Pressure of vapor phase; 1 atm

| | | | | | | | | | | | | |
|---|---|---|---|---|---|---|---|---|---|---|---|---|
| Nitrogen | 239 | 220 | 217 | 173 | 48.5 | 266 | 221 | 470 | 250 | 18 | 220 | 18 |
| Oxygen | 386 | 395 | 402 | 339 | 132 | 319 | 337 | 724 | 370 | 39 | 395 | 39 |

TABLE 1-continued ppm [dissolved gas weight (g)/solvent weight (g)]

| | Methanol | Isopropyl alcohol (used in Example 3) | Ethanol | 1-Butanol | N,N-dimethylformamide | Acetone | Methyl acetate | Diethyl ether | PEGMEA* (solvent for chemical amplification type positive resists) (used in Example 1) | Resist developing solution MF-321 (used in Example 2) | Spin-on-glass solution (used in Example 4) | Ink for ink-jet printer cartridges (used in Example 5) |
|---|---|---|---|---|---|---|---|---|---|---|---|---|
| Nitrogen in air | 188 | 174 | 171 | 137 | 39 | 210 | 175 | 371 | 198 | 14 | 174 | 14 |
| Oxygen in air | 81 | 83 | 84 | 71 | 28 | 67 | 71 | 152 | 78 | 8.2 | 83 | 8.2 |
| Pressure of vapor phase; 2 atm | | | | | | | | | | | | |
| Nitrogen | 478 | 440 | 434 | 346 | 98 | 532 | 442 | 940 | 500 | 36 | 440 | 36 |
| Oxygen | 772 | 790 | 804 | 678 | 264 | 638 | 674 | 1448 | 740 | 78 | 790 | 78 |
| Nitrogen in air | 376 | 348 | 342 | 274 | 78 | 420 | 350 | 742 | 396 | 28 | 348 | 28 |
| Oxygen in air | 162 | 166 | 168 | 142 | 56 | 134 | 142 | 304 | 156 | 16.4 | 166 | 16.4 |

*PEGMEA: polyethylene glycol monomethyl ether acetate.

The degassing of a chemical liquid by using the composite hollow fiber membrane of the present invention is usually carried out by means of a hollow fiber membrane module formed from this composite hollow fiber membrane. The hollow fiber membrane module may be fabricated, for example, by inserting a bundle of several hundred hollow fibers into a cylindrical housing, and filling the space between adjacent hollow fibers with a sealing material while allowing the sealing material to penetrate into the pores of the outer porous layer of the composite hollow fiber membrane.

Figure 2:
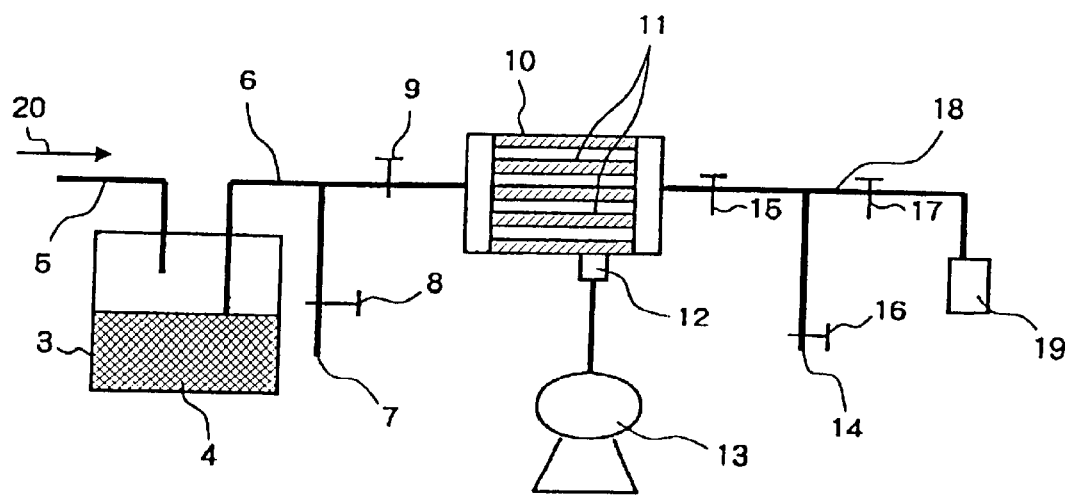
FIG. 2 is a schematic illustration of an exemplary apparatus for degassing a chemical liquid by using the composite hollow fiber membrane of the present invention.

One exemplary method for the degassing of a chemical liquid is specifically described with reference to FIG. 2. A chemical liquid 4 stored in a chemical liquid tank 3 is pressurized by supplying nitrogen gas 20 through a nitrogen supply pipe 5. Thus, using the nitrogen gas pressure as a driving force, the chemical liquid is fed to a hollow fiber membrane module 10 through a chemical liquid feed pipe 6. During this process, valves 9 and 15 are opened, and valves 8 and 17 are closed. A valve 16 is opened until the chemical liquid begins to flow and fills the hollow fiber membrane module, and closed as soon as the chemical liquid flows out of a bypass pipe 14. Within the hollow fiber membrane module, the chemical liquid is fed to the bores of hollow fibers 11, and degassed for a predetermined period of time by evacuating the outside of the hollow fiber membrane to a pressure of 100 Pa to 10 KPa by means of a vacuum pump. After completion of the degassing, valve 17 is opened to feed fresh chemical liquid to the hollow fiber membrane module while discharging the degassed chemical liquid from a chemical liquid nozzle 19. This degassed chemical liquid is fed to a use point. Although the chemical liquid is fed to the boreside of the hollow fiber membrane in this case, the chemical liquid may be degassed by feeding it to the outside of the hollow fiber membrane.

The present invention is more specifically described with reference to the following examples.

EXAMPLE 1

10% by weight of Kraton G-1652 and 80% by weight of Kraton G-1657 (both manufactured by Shell Chemical Co.) were used as styrene-based thermoplastic elastomers, and 10% by weight of ENGAGE 8400 (manufactured by Du Pont-Dow Elastomer Co.; density=0.870 g/cm$^3$) was used as a polyolefin. These polymers were weighed out and meld-blended by means of a biaxial kneading machine. Then, a composite hollow fiber was formed by carrying out three-layer composite spinning through a three-layer composite nozzle while feeding the melt-blended polymer [glass transition temperature (Tg)=−45° C.] to the intermediate layer thereof and feeding high-density polyethylene B161 (manufactured by Asahi Chemical Industry Co., Ltd.) to the innermost and outermost layers thereof. This hollow fiber was annealed at 115° C. for 12 hours, drawn at room temperature by a factor of 1.3, and then drawn at 111° C. by a factor of 5. Thus, there was obtained a three-layer composite hollow fiber membrane in which the innermost and outermost layers comprised porous polyethylene and the intermediate layer comprised a homogeneous thin film of the polymer blend composed of the styrene-based thermoplastic elastomers and the polyolefin. The dimensions, porosity, gas permeation characteristics and chemical resistance of this hollow fiber membrane were tested, and the results thus obtained are shown in Table 2. The water vapor permeation flux of this hollow fiber membrane was $1.5 \times 10^{-3}$ g·m/(m$^2$·day).

EXAMPLE 2

A three-layer composite hollow fiber was formed by carrying out molt Spinning through a three-layer composite nozzle while feeding Teflon AF1600 [a copolymer of (2,2-bistrifluoromethyl-4,5-difluoro-1,3-dioxole) and tetrafluoroethylene in a copolymerization ratio of 60/40 (mole %), manufactured by E.I. du Pont de Nemours & Co., Inc.; glass transition temperature (Tg)=160° C.] to the intermediate layer thereof at a resin temperature of 270° C. and feeding poly(4-methylpentene-1) (manufactured by Mitsui Chemical Co., Ltd.) to the innermost and outermost layers thereof at a resin temperature of 270° C. This hollow fiber was annealed at 220° C. for 12 hours, drawn at room temperature by a factor of 1.3, and then drawn at 111° C. by a factor of 3. Thus, there was obtained a three-layer composite hollow fiber membrane in which the innermost and outermost layers comprised porous poly(4-methylpentene-1) and the intermediate layer comprised a homogeneous thin film of Teflon AF1600. The dimensions, porosity, gas permeation characteristics and chemical resistance of this hollow fiber membrane were tested, and the results thus obtained are shown in Table 2. The water vapor permeation flux of this hollow fiber membrane was $7.3 \times 10^{-2}$ g·m/(m²·day).

EXAMPLE 3

A hollow fiber was formed by carrying out composite spinning through a three-layer composite nozzle while feeding a fluorine-containing thermoplastic elastomer (Daiel Thermoplastic T-630, manufactured by Daikin Industries, Ltd.; glass transition temperature (Tg)=−10° C.) to the intermediate layer thereof at a resin temperature of 200° C. and feeding highly stereoregular isotactic polypropylene [Hipol CJ700 (trade name), manufactured by Mitsui Chemical Co., Ltd.] to the innermost and outermost layers thereof at a resin temperature of 200° C. This hollow fiber was annealed at 150° C. for 12 hours, drawn at room temperature by a factor of 1.3, and then drawn at 145° C. by a factor of 3. Thus, there was obtained a three-layer composite hollow fiber membrane in which the innermost and outermost layers comprised porous isotactic polypropylene and the intermediate layer comprised a homogeneous thin film of the fluorine-containing thermoplastic elastomer. The dimensions, porosity, gas permeation characteristics and chemical resistance of this hollow fiber membrane were tested, and the results thus obtained are shown in Table 2. The water vapor permeation flux of this hollow fiber membrane was $1.9 \times 10^{-3}$ g·m/(m²·day).

EXAMPLE 4

A hollow fiber was formed by carrying out melt spinning through a three-layer composite nozzle while feeding low-crystalline poly(4-methylpentene-1) [MX001, manufactured by Mitsui Chemical Co., Ltd.; glass transition temperature (Tg)=30° C.] to the intermediate layer thereof at 250° C. and feeding highly crystalline poly(4-methylpentene-1) (RT31, manufactured by Mitsui Chemical Co., Ltd.) to the innermost and outermost layers thereof at 250° C. This hollow fiber was annealed at 210° C. for 12 hours., drawn at room temperature by a factor of 1.3, and then drawn at 200° C. by a factor of 5. Thus, there was obtained a three-layer composite hollow fiber membrane in which the innermost and outermost layers comprised porous poly(4-methylpentene-1) and the intermediate layer comprised a homogeneous thin film of poly(4-methylpentene-1). The dimensions, porosity, gas permeation characteristics and chemical resistance of this hollow fiber membrane were tested, and the results thus obtained are shown in Table 2. The water vapor permeation flux of this hollow fiber membrane was $3.3 \times 10^{-3}$ g·m/(m²·day).

EXAMPLE 5

A hollow fiber was formed by carrying out composite spinning through a three-layer composite nozzle while feeding a polyolefin type thermoplastic elastomer (Toughmer XR106L, manufactured by Mitsui Chemical Co., Ltd.; glass transition temperature (Tg)=−60° C.) to the intermediate layer thereof at 190° C. and feeding highly stereoregular isotactic polypropylene [Hipol CJ700 (trade name)] to the innermost and outermost layers thereof at 190° C. This hollow fiber was annealed at 150° C. for 12 hours, drawn at room temperature by a factor of 1.3, and then drawn at 140° C. by a factor of 3. Thus, there was obtained a three-layer composite hollow fiber membrane in which the innermost and outermost layers comprised porous isotactic polypropylene and the intermediate layer comprised a homogeneous thin film of the polyolefin type thermoplastic elastomer. The dimensions, porosity, gas permeation characteristics and chemical resistance of this hollow fiber membrane were tested, and the results thus obtained are shown in Table 2. The water vapor permeation flux of this hollow fiber membrane was $3.1 \times 10^{-3}$ g·m/(m²·day).

EXAMPLE 6

Degassing Treatment of Semiconductor Photoresist and Application of Resist Solution Hollow fiber membrane modules (having a membrane area of 2.5 m²) were fabricated by using the hollow fiber membranes prepared in Examples 1 to 5. Each of them was installed in the chemical liquid feed line illustrated in FIG. 2. By opening valves 9, 15 and 16, the chemical amplification type positive resist solution APEX-E2405 (manufactured by SHIPLEY Inc.) within the chemical liquid tank was fed to the bores of the hollow fibers in hollow fiber membrane module 11 with the aid of nitrogen gas having a pressure of 2 atmospheres. After the hollow fibers was filled with the chemical liquid, valve 16 was closed and the resist solution was degassed by keeping the outside of the hollow fiber membrane at 100 Pa for 30 minutes. A sample of the degassed resist solution was collected through bypass pipe 14 of the chemical liquid feed line and analyzed for dissolved nitrogen concentration.

Then, valve 17 was opened to drop the degassed resist solution onto a silicon wafer while feeding fresh resist solution to the hollow fiber membrane module. The silicon wafer was spun on a spin coater at a rotational speed of 3,000 rpm to spread the dropped resist solution and thereby form a thin resist film (with a thickness of 0.80 μm) on the wafer. After the thin resist film was dried to evaporate any residual solvent, a 100 μm×100 μm region of the thin resist film surface was observed with a scanning electron microscope and thereby examined for the presence of defects considered to be irregularities caused by gas bubbles. The results of evaluation are shown in Table 3.

EXAMPLE 7

Exposure of Semiconductor Photoresist, Degassing Treatment of Developing Solution, and Development The thin resist film obtained in Example 6 was prebaked at 90° C. for 60 seconds, and exposed to light from a KrF excimer laser through a photomask placed in contact with the resist film.

Hollow fiber membrane modules (having a membrane area of 2.5 m²) were fabricated by using the hollow fiber membranes prepared in Examples 1 to 5. Each of them was installed in the developing solution feed line of a coater-developer for use in semiconductor fabrication which was a chemical liquid feed line similar to that of FIG. 2. Then, using nitrogen gas having a pressure of 2 atmospheres, a developing solution (MF-321, manufactured by SHIPLEY Inc.; an aqueous solution of tetramethylammonium hydroxide having a nitrogen gas concentration of 50 ppm) was fed to the bores of the hollow fibers at a flow rate of 1 L/min. After the bores of the hollow fibers were filled with the developing solution, it was degassed by keeping the outside of the hollow fiber membrane at 100 Pa for 30 minutes.

Figure 3:
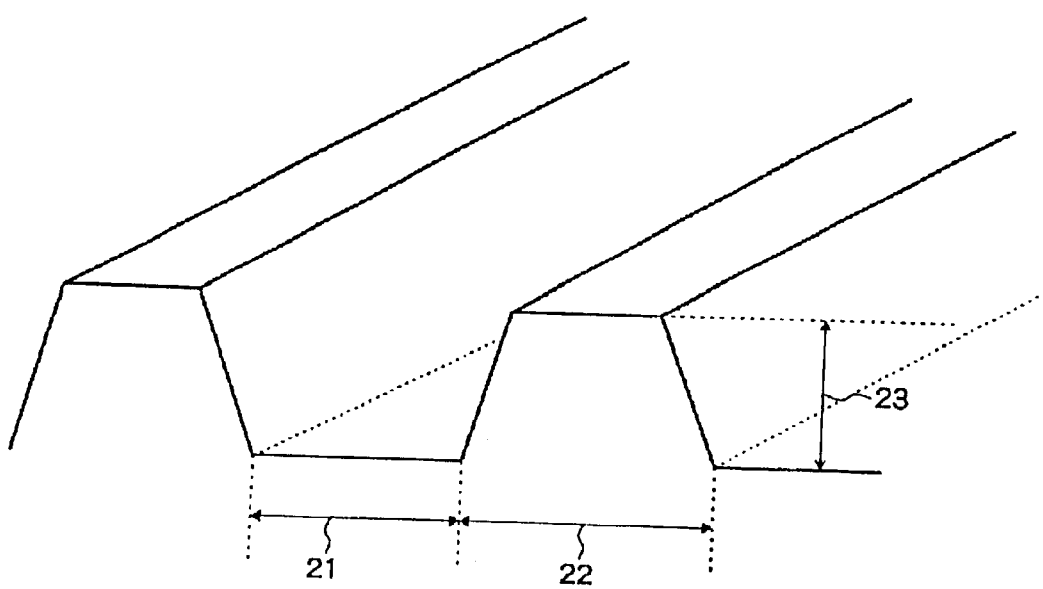
FIG. 3 is a schematic view showing the surface condition of a developed resist film.

After completion of the degassing, the degassed developing solution was dropped from the discharge nozzle onto the exposed surface to develop it. A sample of the degassed developing solution was collected through the bypass pipe and analyzed for dissolved nitrogen concentration. After the resist film resulting from the development was after-baked in a dry oven at 120° C., a 100 μm×100 μm region of the developed surface was observed with a scanning electron microscope and thereby examined for groove width 21, land width 22, groove depth 23 (see FIG. 3) and the presence of defects caused by development. The results of evaluation are shown in Table 4.

EXAMPLE 8

Degassing Treatment of Isopropyl Alcohol

Membrane modules (having a membrane area of 2.5 m$^2$) were fabricated by using the hollow fiber membranes prepared in Examples 1 to 5. Each of them was installed in a chemical liquid feed line similar to that illustrated in FIG. 2. Then, using nitrogen gas having a pressure of 2 atmospheres, isopropyl alcohol was fed to the hollow fiber membrane module in the same manner as in Example 6. After the bores of the hollow fibers were filled with isopropyl alcohol, it was degassed by keeping the outside of the hollow fiber membrane at 100 Pa for 30 minutes. After completion of the degassing, the degassed isopropyl alcohol was dropped from the discharge nozzle onto a silicon wafer to clean it and, at the same time, fresh isopropyl alcohol was fed to the membrane module. A sample of the degassed isopropyl alcohol was collected through the bypass pipe and analyzed for dissolved nitrogen concentration. The results of evaluation are shown in Table 5.

EXAMPLE 9

Degassing Treatment of Spin-on-glass Solution

Membrane modules (having a membrane area of 2.5 m$^2$) were fabricated by using the hollow fiber membranes prepared in Examples 1 to 5. Each of them was installed in a chemical liquid feed line similar to that illustrated in FIG. 2. Then, using nitrogen gas having a pressure of 2 atmospheres, a spin-on-glass solution (composed of 70% by weight of isopropyl alcohol, 2% by weight of tetraethoxysilane and 28% by weight of water) was fed to the hollow fiber membrane module in the same manner as in Example 6. After the bores of the hollow fibers were filled with the spin-on-glass solution, it was degassed by keeping the outside of the hollow fiber membrane at 100 Pa for 30 minutes. After completion of the degassing, valves 9 and 15 were opened to drop the degassed spin-on-glass solution from the discharge nozzle onto a silicon wafer to form an insulating film thereon, while feeding fresh spin-on-glass solution to the hollow fiber membrane module. A sample of the degassed spin-on-glass solution was collected through the bypass pipe 14 of the chemical liquid feed line illustrated in FIG. 2, and analyzed for dissolved nitrogen concentration. After the insulating film formed as above was heated in a dry oven at 150° C. so as to cause the condensation reaction to proceed, a 100 μm×100 μm region of the insulating film surface was observed with a scanning electron microscope and thereby examined for the presence of defects. The results of evaluation are shown in Table 6.

EXAMPLE 10

Degassing Treatment of Ink for Ink-jet Printers, and Printing Test with Degassed Ink Membrane modules (having a membrane area of 2.5 m$^2$) were fabricated by using the hollow fiber membranes prepared in Examples 1 to 5. Five modules of each type were connected in series, and this hollow fiber membrane module assembly was installed in a chemical liquid feed line similar to that illustrated in FIG. 2. While being pressurized under an air pressure of 2 atmospheres, an ink for ink-jet printer cartridges (a dye-based ink containing a solvent composed of 80% by weight of water, 5% by weight of ethylene glycol, and 15% by weight of isopropyl alcohol) was fed to the inside of the hollow fiber membrane at a flow rate of 100 mL/min. Then, the ink was degassed in the same manner as in Example 6, i.e., by keeping the outside of the hollow fiber membrane at 100 Pa for 30 minutes. A sample of the degassed ink having passed through the five modules was collected through bypass pipe 14 shown in FIG. 2, and analyzed for dissolved oxygen and nitrogen concentrations. Then, the degassed ink was discharged from the nozzle shown in FIG. 2 and charged into a vessel of an ink cartridge (by evacuating its internal space and keeping it at 100 Pa). This cartridge was mounted on an Ink-jet Printer PM700C (manufactured by Seiko Epson Corp.) and subjected to a printing test. In this test, the frequency of print dot losses was expressed in terms of the relative proportion of the area of unprinted dots to the total area of print dots. If the frequency of print dot losses is less than 1%, the print has few print dot losses and is recognized as a high-quality print to the naked eye. The results of evaluation are shown in Table 7.

EXAMPLE 11

In this example, cholesterin chloride cholesterin nonanoate (cholesteric liquid crystal) was used as a chemical liquid. Membrane modules (having a membrane area of 2.5 m$^2$) were fabricated by using the hollow fiber membranes prepared in Examples 1 to 5, and each of them was used to carry out a degassing treatment. The chemical liquid was fed and degassed by using an apparatus similar to that described in Example 6. Specifically, the chemical liquid was delivered under pressure with the aid of nitrogen gas (2 atmospheres), fed to the inside of the hollow fiber membrane at a flow rate 6 of 1 L/min, and degassed by keeping the outside of the hollow fiber membrane at 100 Pa for 30 minutes. The liquid crystal was analyzed for dissolved nitrogen concentration before and after degassing, and the degassed liquid crystal was evaluated in a liquid crystal sealing process. The results of evaluation are shown in Table 8.

TABLE 2-1

Results of Evaluation of Characteristics of Hollow Fiber Membranes

|  | Example 1 | Example 2 | Example 3 |
| --- | --- | --- | --- |
| Structure of membrane | Three-layer structure | Three-layer structure | Three-layer structure |
| Inner diameter of hollow fiber membrane (μm) | 270 | 280 | 280 |
| Outer diameter of hollow fiber membrane (μm) | 394 | 422 | 410 |

TABLE 2-1-continued

Results of Evaluation of Characteristics of Hollow Fiber Membranes

| | Example 1 | | | | | Example 2 | | | | | Example 3 | | | | |
|---|---|---|---|---|---|---|---|---|---|---|---|---|---|---|---|
| Inner layer/thickness (μm) | Polyethylene/30 | | | | | Poly(4-methylpentene-1)/35 | | | | | Isotactic polypropylene/32 | | | | |
| Intermediate layer/thickness (μm) | Polymer blend of styrene-based thermoplastic elastomer and polypropylene/2 | | | | | Teflon AF1600/1 | | | | | Daiel Thermoplastic/1 | | | | |
| Outer layer/thickness (μm) | Polyethylene/30 | | | | | Poly(4-methylpentene-1)/35 | | | | | Isotactic polypropylene/32 | | | | |
| Porosity of inner and outer layers (vol %) | 45 | | | | | 45 | | | | | 47 | | | | |
| Initial oxygen permeation flux, × $10^{-9}$ cm$^3$/(cm$^2$ · Pa · sec) | 3.9 | | | | | 140 | | | | | 3.9 | | | | |
| Initial nitrogen permeation flux, × $10^{-9}$ cm$^3$/(cm$^2$ · Pa · sec) | 1.1 | | | | | 51.9 | | | | | 1.1 | | | | |
| Initial permeation flux ratio, oxygen permeation flux/nitrogen permeation flux | 3.5 | | | | | 2.7 | | | | | 3.5 | | | | |
| Chemical liquid used in immersion test* | A | B | C | D | E | A | B | C | D | E | A | B | C | D | E |
| Oxygen permeation flux after immersion in chemical liquid, × $10^{-9}$ cm$^3$/(cm$^2$ · Pa · sec) | 3.9 | 3.9 | 3.9 | 3.9 | 3.9 | 140 | 140 | 140 | 140 | 140 | 3.8 | 3.9 | 3.9 | 3.9 | 3.9 |
| Nitrogen permeation flux after immersion in chemical liquid, × $10^{-9}$ cm$^3$/(cm$^2$ · Pa · sec) | 1.1 | 1.1 | 1.1 | 1.1 | 1.1 | 51.9 | 51.9 | 51.9 | 51.9 | 51.9 | 1.1 | 1.1 | 1.1 | 1.1 | 1.1 |
| Permeation flux ratio after immersion in chemical liquid, oxygen permeation flux/nitrogen permeation flux | 3.5 | 3.5 | 3.5 | 3.5 | 3.5 | 2.7 | 2.7 | 2.7 | 2.7 | 2.7 | 3.45 | 3.5 | 3.5 | 3.5 | 3.5 |
| Percentage change in weight of hollow fiber membrane after immersion in chemical liquid (%) | 0.05 | 0.1 | 0.1 | 0 | 0 | 0 | 0 | 0 | 0 | 0 | 0 | 0 | 0 | 0 | 0 |

A, isopropyl alcohol; B, semiconductor developing solution; C, spin-on-glass solution [isopropyl alcohol/tetraethoxy-silane/water = 70/2/28 (wt %)]; D, ink for ink-jet printers; E, cholesteric liquid crystal (cholesterin chloride cholesterin nonanoate).
*Test conditions: immersed at 20° C. for 7 days.

TABLE 2-2

Results of Evaluation of Characteristics of Hollow Fiber Membranes

| | Example 4 | | | | | Example 5 | | | | |
|---|---|---|---|---|---|---|---|---|---|---|
| Structure of membrane | Three-layer structure | | | | | Three-layer structure | | | | |
| Inner diameter of hollow fiber membrane (μm) | 280 | | | | | 280 | | | | |
| Outer diameter of hollow fiber membrane (μm) | 422 | | | | | 422 | | | | |
| Inner layer/thickness (μm) | Poly(4-methylpentene-1)/35 | | | | | Isotactic polypropylene/40 | | | | |
| Intermediate layer/thickness (μm) | Poly(4-methylpentene-1)/35 | | | | | Polyolefin elastomer (Toughmer XR106L, mfd. by Mitsui Chemical Co., Ltd.)/1 | | | | |
| Outer layer/thickness (μm) | Poly(4-methylpentene-1)/35 | | | | | Isotactic polypropylene/40 | | | | |
| Porosity of inner and outer layers (vol %) | 35 | | | | | 38 | | | | |
| Initial oxygen permeation flux, × $10^{-9}$ cm$^3$/(cm$^2$ · Pa · sec) | 12.8 | | | | | 1.75 | | | | |
| Initial nitrogen permeation flux, × $10^{-9}$ cm$^3$/(cm$^2$ · Pa · sec) | 3.2 | | | | | 0.5 | | | | |
| Initial permeation flux ratio, oxygen permeation flux/nitrogen permeation flux | 4.0 | | | | | 3.5 | | | | |
| Chemical liquid used in immersion test* | A | B | C | D | E | A | B | C | D | E |
| Oxygen permeation flux after immersion in chemical liquid, × $10^{-9}$ cm$^3$/(cm$^2$ · Pa · sec) | 12.7 | 12.7 | 11.9 | 12.0 | 12.7 | 1.73 | 1.73 | 1.73 | 1.73 | 1.73 |
| Nitrogen permeation flux after immersion in chemical liquid, × $10^{-9}$ cm$^3$/(cm$^2$ · Pa · sec) | 3.1 | 3.1 | 3.1 | 3.1 | 3.2 | 0.5 | 0.5 | 0.5 | 0.5 | 0.5 |
| Permeation flux ration after immersion in chemical liquid, oxygen permeation flux/nitrogen permeation flux | 4.0 | 4.0 | 3.8 | 4.0 | 3.9 | 3.5 | 3.5 | 3.5 | 3.5 | 3.5 |
| Percentage change in weight of hollow fiber membrane after immersion in chemical liquid (%) | 0.05 | 0.02 | 0.05 | 0.05 | 0.01 | 0.1 | 0.1 | 0.1 | 0.1 | 0.1 |

A, isopropyl alcohol; B, semiconductor developing solution; C, spin-on-glass solution [isopropyl alcohol/tetraethoxy-silane/water = 70/2/28 (wt %)]; D, ink for ink-jet printers; E, cholesteric liquid crystal (cholesterin chloride cholesterin nonanoate).

TABLE 3

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module ($m^2$) | 2.5 | 2.5 | 2.5 | 2.5 | 2.5 |
| Chemical liquid to be degassed | Chemical amplification type positive resist APEX-E2405 | | | | |
| Dissolved nitrogen gas concentration in chemical liquid before degassing (converted to a weight basis) | 190 ppm | 190 ppm | 190 ppm | 190 ppm | 190 ppm |
| Dissolved nitrogen gas concentration in chemical liquid after degassing (converted to a weight basis) | 19.0 | 3.8 | 19.0 | 6.3 | 38.0 |
| Evaluation of degassed chemical liquid (evaluated in an actual process) | Electron microscopic observation revealed that there ware no irregularities in the resist film surface. | | | | |

TABLE 4

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module ($m^2$) | 2.5 | 2.5 | 2.5 | 2.5 | 2.5 |
| Chemical liquid to be degassed | Resist developing solution MF-321 (mfd. by SHIPLEY Inc.) | | | | |
| Dissolved nitrogen gas concentration in chemical liquid before degassing (converted to a weight basis) | 26.0 | 26.0 | 26.0 | 26.0 | 26.0 |
| Dissolved nitrogen gas concentration in chemical liquid after degassing (converted to a weight basis) | 2.6 | 0.87 | 2.6 | 1.3 | 5.2 |
| Evaluation of degassed chemical liquid (evaluated in an actual process) | Electron microscopic observation revealed that there ware no defects in the developed surface and that the resist film had a groove width of 0.22 $\mu$m, a land width of 0.30 $\mu$m, and a groove depth of 0.5 $\mu$m. | | | | |

TABLE 5

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module ($m^2$) | 2.5 | 2.5 | 2.5 | 2.5 | 2.5 |
| Chemical liquid to be degassed | Isopropyl alcohol | | | | |
| Dissolved nitrogen gas concentration in chemical liquid before degassing (converted to a weight basis) | 420.0 | 420.0 | 420.0 | 420.0 | 420.0 |
| Dissolved nitrogen gas concentration in chemical liquid after degassing (converted to a weight basis) | 42.0 | 14.0 | 42.0 | 21.0 | 84.0 |
| Evaluation of degassed chemical liquid (evaluated in an actual process) | The resist film was cleaned with the degassed isopropyl alcohol. No gas bubbles were produced on the resist film surface. | | | | |

TABLE 6

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module (m$^2$) | 2.5 | 2.5 | 2.5 | 2.5 | 2.5 |
| Chemical liquid to be degassed | | | Spin-on-glass solution | | |
| Dissolved nitrogen gas concentration in chemical liquid before degassing (converted to a weight basis) | 410.0 | 410.0 | 410.0 | 410.0 | 410.0 |
| Dissolved nitrogen gas concentration in chemical liquid after degassing (converted to a weight basis) | 41.0 | 13.7 | 41.0 | 20.5 | 82.0 |
| Evaluation of degassed chemical liquid (evaluated in an actual process) | | Electron microscopic observation revealed that there were no defects in the spin-on-glass film (or insulating film) surface. | | | |

TABLE 7

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module (m$^2$) | 2.5 | 2.5 | 2.5 | 2.5 | 2.5 |
| Chemical liquid to be degassed | | | Ink for ink-jet printer cartridges | | |
| Dissolved nitrogen gas concentration in chemical liquid before degassing (converted to a weight basis) | 18.0 | 18.0 | 18.0 | 18.0 | 18.0 |
| Dissolved nitrogen gas concentration in chemical liquid after degassing (converted to a weight basis) | 1.8 | 0.6 | 1.8 | 0.9 | 3.6 |
| Frequency of print dot losses when degassed ink was charged into an ink cartridge and used for printing purposes (%) | 0.7 | 0.2 | 0.8 | 0.4 | 1.0 |

TABLE 8

Degassing Treatment of Chemical Liquid and Evaluation of Degassed Chemical Liquid

| Hollow fiber membrane used for degassing treatment | Example 1 | Example 2 | Example 3 | Example 4 | Example 5 |
|---|---|---|---|---|---|
| Membrane area of membrane module (m$^2$) | 2.5 | 2.5 | 2.5 | 2.5 | 2.5 |
| Chemical liquid to be degassed | | Cholesterin chloride cholesterin nonanoate (cholesteric liquid crystal) | | | |
| Dissolved nitrogen gas concentration in chemical liquid before degassing (converted to a weight basis) | 450 (saturated state) | 450 (saturated state) | 450 (saturated state) | 450 (saturated state) | 450 (saturated state) |
| Dissolved nitrogen gas concentration in chemical liquid after degassing (converted to a weight basis) | 45.0 | 15.0 | 45.0 | 22.5 | 90.0 |
| Evaluation of degassed chemical liquid (evaluated in an actual process) | | Two glass plates were positioned in parallel at an interval of 5 mm and the space therebetween was evacuated to 1,000 pa (≈10 torr). Each of the aforesaid five degassed liquid crystals could be sealed into the evacuated space without producing gas bubbles. | | | |

EXAMPLE 12

10% by weight of Kraton G-1652 and 80% by weight of Kraton G-1657 (both manufactured by Shell Chemical Co.) were used as styrene-based thermoplastic elastomers, and 10% by weight of ENGAGE 8400 (manufactured by Du Pont-Dow Elastomer Co.; density=0.870 g/cm$^3$) was used as a polyolefin. These polymers were weighed out and meld-blended by means of a biaxial kneading machine. Then, a hollow fiber was formed by carrying out melt spinning in a three-layer configuration in which the resulting modified thermoplastic elastomer [glass transition temperature (Tg)=−45° C.] was disposed in the intermediate layer and high-density polyethylene B161 (manufactured by Asahi Chemical Industry Co., Ltd.) was disposed in the innermost and outermost layers. This hollow fiber was annealed at 115° C. for 12 hours, drawn at room temperature by a factor of 1.3, and then drawn at 111° C. by a factor of 5. Thus, there was obtained a three-layer composite hollow fiber membrane (with an inner diameter of 300 μm and an outer diameter of 420 μm) in which the innermost and outermost layers comprised porous polyethylene and the intermediate layer comprised a homogeneous thin film of the polymer blend composed of the styrene-based thermoplastic elastomers and the polyolefin. The porous layers (i.e., the innermost and outermost layers) both had a thickness of 30 μm and a porosity of 50 vol %. The homogeneous thin film layer had a thickness of 0.8 μm. This hollow fiber membrane had an oxygen permeation flux of $6.0\times10^{-9}$ $cm^3 \cdot cm^{-2} \cdot sec^{-1} \cdot Pa^{-1}$ and a nitrogen permeation flux of $4.6\times10^{-9}$ $cm^3 \cdot cm^{-2} \cdot sec^{-1} \cdot Pa^{-1}$. When this hollow fiber membrane was immersed in a 50/50 (wt %) mixture of water and isopropyl alcohol (IPA) at 20° C. for 7 days in the same manner as described in connection with Table 1, its oxygen and nitrogen permeation fluxes were $6.0\times10^{-9}$ $cm^3 \cdot cm^{-2} \cdot sec^{-1} \cdot Pa^{-1}$ and $4.6\times10^{-9}$ $cm^3 \cdot cm^{-2} \cdot sec^{-1} \cdot Pa^{-1}$, respectively, and the hollow fiber membrane retained its initial state. The percent change in weight of the membrane was also zero. A total 5,000 three-layer hollow fibers as described above were bound together to make a hollow fiber bundle, and a 50/50 (wt %) mixture of water and IPA having a dissolved oxygen concentration of 8 ppm was degassed by feeding it to the inside of the hollow fiber membrane at a flow rate of 5 L/min and keeping the outside of the hollow fiber membrane at 30 torr. The dissolved oxygen concentration after degassing was 0.1 ppm. The water vapor permeation flux of this hollow fiber membrane was $1.9\times10^{-3}$ $g \cdot m/(m^2 \cdot day)$.

EXAMPLE 13

A total of 2,500 three-layer hollow fibers formed as described in Example 8 were bound together to make a hollow fiber bundle, and a 60/40 (wt %) mixture of IPA and water containing 1 ppm of dissolved oxygen was degassed by feeding it to the inside of the hollow fiber membrane at a flow rate of 5 L/min and keeping the outside of the hollow fiber membrane at 30 torr. The dissolved oxygen concentration in the mixture after degassing was 0.06 ppm.

EXAMPLE 14

90% by weight of HSBR1390P (manufactured by Japan Synthetic Rubber Co., Ltd.; styrene content=30% by weight) was used as a styrene-based thermoplastic elastomer, and 10% by weight of ENGAGE 8400 (manufactured by Du Pont-Dow Elastomer Co.; density=0.870 g/cm³) was used as a polyolefin. These polymers were weighed out and meld-blended by means of a biaxial kneading machine. Then, a hollow fiber was formed by carrying out melt spinning in a three-layer configuration in which the resulting modified thermoplastic elastomer [glass transition temperature (Tg)=−55° C.] was disposed in the intermediate layer and high-density polyethylene B161 (manufactured by Asahi Chemical Industry Co., Ltd.) was disposed in the innermost and outermost layers. This hollow fiber was annealed at 115° C. for 12 hours, drawn at room temperature by a factor of 1.3, and then drawn at 111° C. by a factor of 5. Thus, there was obtained a three-layer composite hollow fiber membrane (with an inner diameter of 300 μm and an outer diameter of 420 μm) in which the innermost and outermost layers comprised porous polyethylene and the intermediate layer comprised a homogeneous thin film. The porous layers (i.e., the innermost and outermost layers) both had a thickness of 30 μm and a porosity of 50 vol %. The homogeneous thin film layer had a thickness of 0.8 μm. This hollow fiber membrane had an oxygen permeation flux of $7.5\times10^{-9}$ $cm^3 \cdot cm^{-2} \cdot sec^{-1} \cdot Pa^{-1}$ and a nitrogen permeation flux of $2.1\times10^{-9}$ $cm^3 \cdot cm^{-2} \cdot sec^{-1} \cdot Pa^{-1}$. When this hollow fiber membrane was immersed in a 50/50 (wt %) mixture of water and IPA at 20° C. for 7 days in the same manner as described in connection with Table 1, its oxygen and nitrogen permeation fluxes were $7.5\times10^{-9}$ $cm^3 \cdot cm^{-2} \cdot sec^{-1} \cdot Pa^{-1}$ and $2.1\times10^{-9}$ $cm^3 \cdot cm^{-2} \cdot sec^{-1} \cdot Pa^{-1}$, respectively, and the hollow fiber membrane retained its initial state. The percent change in weight of the membrane was also zero. A total of 5,000 three-layer composite hollow fibers as described above were bound together to make a hollow fiber bundle, and a 50/50 (wt %) mixture of water and IPA having a dissolved oxygen concentration of 100 ppm was degassed by feeding it to the inside of the hollow fiber membrane at a flow rate of 5 L/min and keeping the outside of the hollow fiber membrane at 30 torr. The dissolved oxygen concentration after degassing was 0.9 ppm. The water vapor permeation flux of this hollow fiber membrane was $2.50\times10^{-3}$ $g \cdot m/(m^2 \cdot day)$.

EXAMPLE 15

MK Resin MK-2F [manufactured by Dai Nippon Plastics Co., Ltd.; glass transition temperature (Tg)=−35° C.] was used as a polymer blend composed of a styrene-based thermoplastic elastomer and polypropylene. Then, using a three-layer composite nozzle in which the aforesaid polymer blend was disposed in the intermediate layer and high-density polyethylene ("Nipolon Hard 5110", manufactured by Tosoh Corp.) was disposed in the innermost and outermost layers, the molten resins were spun at a resin temperature of 190° C. and a draft ratio of 700 to form a hollow fiber. This hollow fiber was annealed at 115° C. for 12 hours, drawn at room temperature by a factor of 1.2, and then drawn at 111° C. by a factor of 2. Thus, there was obtained a three-layer composite hollow fiber membrane (with an inner diameter of 300 μm and an outer diameter of 424 μm) in which the innermost and outermost layers comprised porous polyethylene and the intermediate layer comprised a homogeneous thin film. The porous layers (i.e., the innermost and outermost layers) both had a thickness of 30 μm and a porosity of 50 vol %. The homogeneous thin film layer had a thickness of 2.0 μm.

When this hollow fiber membrane was immersed in a 50/50 (wt %) mixture of water and IPA at 20° C. for 7 days in the same manner as described in connection with Table 1, its oxygen and nitrogen permeation fluxes were $7.5\times10^{-9}$ $cm^3 \cdot cm^{-2} \cdot sec^{-1} \cdot Pa^{-1}$ and $2.1\times10^{-9}$ $cm^3 \cdot cm^{-2} \cdot sec^{-1} \cdot Pa^{-1}$, respectively, and the hollow fiber membrane retained its initial state. The percent change in weight of the membrane was also zero. A total of 5,000 three-layer composite hollow fibers as described above were bound together to make a hollow fiber bundle, and a 50/50 (wt %) mixture of water and IPA having a dissolved oxygen concentration of 120 ppm was degassed by feeding it to the inside of the hollow fiber membrane at a flow rate of 5 L/min and keeping the outside of the membrane at 30 torr. The dissolved oxygen concentration after degassing was 1.6 ppm. When this degassing operation was continued for one month, the dissolved oxygen concentration after degassing remained unchanged throughout the operation period. The water vapor permeation flux of this hollow fiber membrane was $1.50\times10^{-3}$ $g \cdot m/(m^2 \cdot day)$.

EXAMPLE 16

DYNARON H4800N [manufactured by JSR Co.; glass transition temperature (Tg)=−45° C.] was used as a polymer blend composed of a styrene-based thermoplastic elastomer and polypropylene. Then, using a three-layer composite nozzle in which the aforesaid polymer blend was disposed in the intermediate layer and high-density polyethylene ("Nipolon Hard 5110", manufactured by Tosoh Corp.) was disposed in the innermost and outermost layers, the molten resins were spun at a resin temperature of 190° C. and a draft ratio of 850 to form a hollow fiber. This hollow fiber was annealed at 115° C. for 12 hours, drawn at room temperature by a factor of 1.2, and then drawn at 111° C. by a factor of 2.0. Thus, there was obtained a three-layer composite hollow fiber membrane (with an inner diameter of 300 $\mu$m and an outer diameter of 362 $\mu$m) in which the innermost and outermost layers comprised porous polyethylene and the intermediate layer comprised a homogeneous thin film. The porous layers (i.e., the innermost and outermost layers) both had a thickness of 30 $\mu$m and a porosity of 50 vol %. The homogeneous thin film layer had a thickness of 1.0 $\mu$m. This hollow fiber membrane had an oxygen permeation flux of $6.7\times10^{-9}$ $cm^3 \cdot cm^{-2} \cdot sec^{-1} \cdot Pa^{-1}$ and a nitrogen permeation flux of $2.2\times10^{-9}$ $cm^3 \cdot cm^{-2} \cdot sec^{-1} \cdot Pa^{-1}$. In this example, the water vapor permeation flux was $2.50\times10^{-3}$ $g \cdot m/(m^2 \cdot day)$.

A total of 1,200 composite hollow fibers as described above were bound together to make a hollow fiber bundle. This hollow fiber bundle was inserted into a cylindrical housing made of a modified polyphenylene ether resin. At the opposite ends of the cylinder, the space between hollow fibers was sealed with a crosslinked bismaleimide resin to fabricate a membrane module. The vacuum side of this membrane module was evacuated to 100 Pa by means of a vacuum pump connected thereto. At the same time, using an ink feed pump attached to an ink-jet printer (Design Jet 3500CP, manufactured by Hewlett Packard Co.), a pigment-based black ink (manufactured by Hewlett Packard Co.) was fed to the primary side (or inside) of the hollow fiber membrane and thereby degassed. The degassed ink was fed to the ink head and used for printing on 54 inch wide paper for exclusive use. The dissolved oxygen concentration in the degassed printer ink was 0.05 ppm. The printing was continued until the ink charged into the ink cartridge for ink-jet printers was completely exhausted. Immediately before the ink was exhausted, the dissolved oxygen concentration in the ink was 0.06 ppm. When the number of unprinted dots and the total number of print dots were determined by observation with a magnifying projector, the frequency of print dot losses in the resulting prints was found to be 0.5% and remained constant throughout the degassing operation. The frequency of print dot losses is a value defined by the following equation. Dot areas were determined from an image thrown by a magnifying projector.

$$\text{Frequency of print dot losses (\%)} = \frac{\text{Sum of dot areas in poorly printed regions}}{\text{Sum of dot areas in printed regions}} \times 100$$

EXAMPLE 17

MK Resin MK-2F (manufactured by Dai Nippon Plastics Co., Ltd.) was used as a polymer blend composed of a styrene-based thermoplastic elastomer and polypropylene. Then, using a three-layer composite nozzle in which the aforesaid polymer blend was disposed in the intermediate layer and high-density polyethylene ("Nipolon Hard 5110", manufactured by Tosoh Corp.) was disposed in the innermost and outermost layers, the molten resins were spun at a resin temperature of 190° C. and a draft ratio of 850 to form a hollow fiber. This hollow fiber was annealed at 115° C. for 12 hours, drawn at room temperature by a factor of 1.2, and then drawn at 111° C. by a factor of 2.0. Thus, there was obtained a three-layer composite hollow fiber membrane (with an inner diameter of 300 $\mu$m and an outer diameter of 362 $\mu$m) in which the innermost and outermost layers comprised porous polyethylene and the intermediate layer comprised a homogeneous thin film of the polymer blend composed of a styrene-based thermoplastic elastomer and polypropylene. The porous layers (i.e., the innermost and outermost layers) both had a thickness of 30 $\mu$m and a porosity of 50 vol %. The homogeneous thin film layer had a thickness of 1.0 $\mu$m. This hollow fiber membrane had an oxygen permeation flux of $6.7\times10^{-9}$ $cm^3 \cdot cm^{-2} \cdot sec^{-1} \cdot Pa^{-1}$ and a nitrogen permeation flux of $2.2\times10^{-9}$ $cm^3 \cdot cm^{-2} \cdot sec^{-1} \cdot Pa^{-1}$. The water vapor permeation flux of this hollow fiber membrane was $1.55\times10^{-3}$ $g \cdot m/(m^2 \cdot day)$.

A total of 1,200 composite hollow fibers as described above were bound together to make a hollow fiber bundle. This hollow fiber bundle was inserted into a cylindrical housing made of a modified polyphenylene ether resin. At the opposite ends of the cylinder, the space between hollow fibers was sealed with a crosslinked bismaleimide resin to fabricate a membrane module. The vacuum side of this membrane module was evacuated to 100 Pa by means of a vacuum pump connected thereto. At the same time, using an ink feed pump attached to an ink-jet printer (Design Jet 3500CP, manufactured by Hewlett Packard Co.), a pigment-based black ink (manufactured by Hewlett Packard Co.) was fed to the primary side (or inside) of the hollow fiber membrane, and degassed by means of a degassing apparatus illustrated in FIG. 2. The degassed ink was fed to the ink head and used for printing on 54 inch wide paper for exclusive use. The dissolved oxygen concentration in the degassed printer ink was 0.05 ppm. The printing was continued until the ink charged into the ink cartridge for ink-jet printers was completely exhausted. Immediately before the ink was exhausted, the dissolved oxygen concentration in the ink was 0.06 ppm. When the number of unprinted dots and the total number of print dots were determined by observation with a magnifying projector, the frequency of print dot losses in the resulting prints was found to be 0.5% and remained constant throughout the degassing operation.

COMPARATIVE EXAMPLE 1

Melt spinning was carried out under the same conditions as in Example 1, except that a styrene-based thermoplastic elastomer alone (i.e., 100% by weight of Kraton G-1657, manufactured by Shell Chemical Co.) was used in the intermediate layer. However, the melt viscosity of the styrene-based thermoplastic elastomer was so high that the styrene-based thermoplastic elastomer in its molten state could not be extruded from the extruder. Consequently, it was impossible to form a three-layer composite hollow fiber membrane.

COMPARATIVE EXAMPLE 2

A three-layer composite hollow fiber membrane was formed under the same conditions as in Example 1, except that ENGAGE 8400 (manufactured by Du Pont-Dow Elastomer Co.; density=0.870 $g/cm^3$) alone was used in the intermediate layer. This hollow fiber membrane had an oxygen permeation flux of $2\times10^{-7}$ $cm^3 \cdot cm^{-2} \cdot sec^{-1}$ $cmHg^{-1}$.

The porous layers and the homogeneous thin film had the same thicknesses as those obtained in Example 1. A total of 5,000 three-layer hollow fibers as described above were bound together to make a hollow fiber bundle, and raw water having a dissolved oxygen concentration of 8 ppm was degassed by feeding it to the inside of the hollow fiber membrane at a flow rate of 5 L/min and keeping the outside of the membrane at 30 torr. The dissolved oxygen concentration after degassing was 5 ppm.

COMPARATIVE EXAMPLE 3

A total of 5,000 porous polypropylene hollow fibers [KPF190M (trade name), manufactured by Mitsubishi Rayon Co., Ltd.] were bound together to fabricate a membrane module. Using this membrane module, degassing experiments on a developing solution, a semiconductor resist and an ink for ink-jet printers were carried out in the same manner as in Example 1. The developing solution contained a surface-active agent. In all experiments, the membrane failed to produce a degassing effect because the chemical liquid leaked through the pores of the membrane.

COMPARATIVE EXAMPLE 4

A total of 200 polytetrafluoroethylene tubes [Poreflon (trade name), manufactured by Sumitomo Electrochemical Co., Ltd.; membrane thickness=50 $\mu$m] were bound together to fabricate a membrane module. Using this membrane module, degassing experiments on a developing solution, a semiconductor resist and an ink for ink-jet printers were carried out in the same manner as in Example 1. The developing solution contained a surface-active agent. In all experiments, the membrane failed to produce a degassing effect because the chemical liquid leaked through the pores of the membrane.

COMPARATIVE EXAMPLE 5

A three-layer composite hollow fiber membrane was formed in the same manner as in Example 1, except that the thickness of the intermediate layer was altered to 20 $\mu$m. This hollow fiber membrane had an oxygen permeation flux of $4\times10^{-10}$ cm$^3$·cm$^{-2}$·sec$^{-1}$·Pa$^{-1}$ and a nitrogen permeation flux of $1.7\times10^{-1}$ cm$^3$·cm$^{-2}$·sec$^{-1}$·Pa$^{-1}$. A total of 5,000 three-layer hollow fibers as described above were bound together to fabricate a hollow fiber membrane module. Using this membrane module, a developing solution was degassed in the same manner as in Example 6. Similarly to Example 6, a 100 $\mu$m×100 $\mu$m region of the developed surface was observed with a scanning electron microscope and thereby examined for the presence of defects in the groove and land portions. As a result, 100 circular undeveloped spots having a radius of 0.5 $\mu$m were observed in this region. Thus, the membrane failed to produce a degassing effect.

COMPARATIVE EXAMPLE 6

A total of 5,000 three-layer composite hollow fibers [MHF200TL, manufactured by Mitsubishi Rayon Co., Ltd.; the porous layers comprising polyethylene and both having a thickness of 25 $\mu$m; the homogeneous film comprising a polyurethane and having a thickness of 1 $\mu$m; inner diameter=200 $\mu$m; water vapor permeation flux=$7.30\times10^{-1}$ g·m/(m$^2$·day)] were bound together to fabricate a hollow fiber membrane module. Using this membrane module, isopropyl alcohol was degassed in the same manner as in Example 8. In this example, the homogeneous film swelled with the chemical liquid, and the percentage change in weight of the hollow fiber membrane was 95%. When it was tried to carry out a degassing treatment by using this hollow fiber membrane, successful degassing was not achieved because the homogeneous film was broken and the chemical liquid leaked through the porous layers.

COMPARATIVE EXAMPLE 7

An ink was degassed in the same manner as in Example 16, except that the hollow fibers used for the degassing purpose comprised silicon tubes (with an inner diameter of 300 $\mu$m and a wall thickness of 100 $\mu$m). The degassed ink was fed to the ink head and used for printing on 54 inch wide paper for exclusive use. The printing was continued until the ink charged into the ink cartridge for ink-jet printers was completely exhausted. With respect to a print obtained immediately after the start of the printing, the number of unprinted dots and the total number of print dots were determined by observation with a magnifying projector. Thus, the frequency of print dot losses was found to be 0.1%. At the time when about half of the charged ink had been used, the frequency of print dot losses was determined in the same manner and found to be 1%. Moreover, at the time when about half of the charged ink had been used, the deposition of a scum was revealed by observation of the surfaces on the secondary side of the degassing tubes. This caused a reduction in apparent gas permeability, so that the dissolved gas concentrations were equal to 70% of the saturated concentrations under atmospheric pressure. This reduction in gas permeability was considered to be responsible for the increase in the frequency of print dot losses.

COMPARATIVE EXAMPLE 8

A total of 1,200 silicon tubes (with an inner diameter of 300 $\mu$m, an outer diameter of 500 $\mu$m, and a membrane thickness of 100 $\mu$m) were bound together to make a hollow fiber bundle. This hollow fiber bundle was inserted into the same housing as used in Example 17 to fabricate a membrane module. The same ink as used in Example 17 was subjected to a printing test by feeding the ink to the aforesaid membrane module and using it in the same printer. While the frequency of print dot losses was 0.2% at the start of the printing, it was 2% immediately before the ink was exhausted. The deposition of a scum was noted on the surfaces on the negative-pressure side of the membrane contained in the membrane module. This caused a reduction in the apparent gas permeability of the membrane, so that the dissolved gas concentrations were equal to 95% of the saturated concentrations under atmospheric pressure. This reduction in gas permeability was considered to be responsible for the increase in the frequency of print dot losses.

COMPARATIVE EXAMPLE 9

Comparative Example 7 was repeated by using tetrafluoroethylene tubes (with an inner diameter of 300 $\mu$m, an outer diameter of 500 $\mu$m, and a membrane thickness of 100 $\mu$m) in place of the silicone tubes. A total of 1,200 such tetrafluoroethylene tubes were bound together to make a hollow fiber bundle. This hollow fiber bundle was inserted into the same housing as used in Example 16 to fabricate a membrane module. The same ink as used in Example 16 was subjected to a printing test by feeding the ink to the aforesaid membrane module and using it in the same printer. While the frequency of print dot losses was 0.2% at the start of the printing, it was 2% immediately before the ink was exhausted. The deposition of a scum was noted on the surfaces on the negative-pressure side of the membrane contained in the membrane module. This caused a reduction in the apparent gas permeability of the membrane, so that the dissolved gas concentrations were equal to 96% of the saturated concentrations under atmospheric pressure. This reduction in gas permeability was considered to be responsible for the increase in the frequency of print dot losses.

COMPARATIVE EXAMPLE 10

Isopropyl alcohol was degassed under the same conditions as in Example 8, except that a heterohomogeneous hollow fiber membrane [SEPAEL, manufactured by Dainippon Ink & Chemicals, Inc.; glass transition temperature (Tg)=30° C.] formed from poly(4-methylpentene-1) was used as the degassing membrane. However, successful degassing was not achieved because isopropyl alcohol began to leak to the secondary side of the membrane immediately after the start of the degassing operation.

COMPARATIVE EXAMPLE 11

The chemical amplification type positive resist solution APEX-E2405 (manufactured by SHIPLEY Inc.) was degassed under the same conditions as in Example 6, except that a heterohomogeneous hollow fiber membrane (SEPAEL, manufactured by Dainippon Ink & Chemicals) formed from poly(4-methylpentene-1) was used as the degassing membrane. Before the hollow fiber membrane was immersed in this resist solution, the ratio of oxygen permeation flux to nitrogen permeation flux was 1.2. After immersion, however, the ratio of oxygen permeation flux to nitrogen permeation flux was 0.93 and the percentage change in weight was 31%. When this hollow fiber membrane was used to degas the resist solution, successful degassing was not achieved because the resist solution began to leak to the secondary side of the membrane immediately after the start of the degassing operation.

The composite hollow fiber membranes of the present invention can be produced at a lower cost than fluroresin tubular membranes conventionally used for the degassing of chemical liquids, and degassing membrane modules can also be fabricated at a lower cost. This permits the user to reduce running costs. Moreover, they have great practical utility in that they can be installed in a limited space (for example, in an ink-jet printer) as a degassing membrane.

What is claimed is:

1. A composite hollow fiber membrane having high durability to chemical liquids which has a composite structure consisting of a homogenous thermoplastic resin thin film interposed between porous thermoplastic resin substrate layers wherein the ratio of the oxygen permeation flux to the nitrogen permeation flux of the membrane is not less than 1.1 and wherein, after the durability test in which the membrane has been immersed in chemical liquids according to JIS K 7114, the percentage change of the ratio is within ±10% and the percentage change in weight of the membrane is in the range of 0 to +30%.

2. A composite hollow fiber membrane as claimed in claim 1, wherein the membrane has a nitrogen permeation flux of not more than $0.5 \times 10^{-9}$ cm$^3$/(cm$^2$·Pa·sec) and an oxygen permeation flux of not less than $0.6 \times 10^{-9}$ cm$^3$/(cm$^2$·Pa·sec).

3. A composite hollow fiber membrane as claimed in claims 1 or 2, wherein the membrane has a water vapor permeation flux of not greater than $1 \times 10^{-2}$ g·m/(m$^2$·day).

4. A composite hollow fiber membrane as claimed in claim 3, wherein the porous substrate layers comprise polyethylene, polypropylene, poly(4-methylpentene-1), poly(vinylidene fluoride) or polyoxymethylene.

5. A composite hollow fiber membrane as claimed in claim 4, wherein the homogeneous thin film comprises a copolymer of (2,2-bistrifluoromethyl-4,5-difluoro-1,3-dioxole) and tetrafluoroethylene, low-crystalline poly(4-methylpentene-1), a polymer blend composed of a styrene-based thermoplastic elastomer and a polyolefin, a fluorine-containing thermoplastic elastomer, or a polyolefin-based thermoplastic elastomer.

6. A composite hollow fiber membrane as claimed in claim 4, wherein the homogeneous thin film comprises a polymer blend composed of a polyolefin having a density of not greater than 0.900 g/cm$^3$ and a styrene-based thermoplastic elastomer selected from a block copolymer of polystyrene segments and segments formed from at least one monomer selected from butadiene, ethylene-butylene, isoprene and ethylene-propylene, and a random copolymer composed of styrene and at least one of butadiene, ethylene-butylene, isoprene and ethylene-propylene.

7. A composite hollow fiber membrane as claimed in claim 3, wherein the homogeneous thin film comprises a copolymer of (2,2-bistrifluoromethyl-4,5-difluoro-1,3-dioxole) and tetrafluoroethylene, low-crystalline poly(4-methylpentene-1), a polymer blend composed of a styrene-based thermoplastic elastomer and a polyolefin, a fluorine-containing thermoplastic elastomer, or a polyolefin-based thermoplastic elastomer.

8. A composite hollow fiber membrane as claimed in claim 3, wherein the homogeneous thin film comprises a polymer blend composed of a polyolefin having a density of not greater than 0.900 g/cm$^3$ and a styrene-based thermoplastic elastomer selected from a block copolymer composed of polystyrene segments and segments formed from at least one monomer selected from butadiene, ethylene-butylene, isoprene and ethylene-propylene, and a random copolymer composed of styrene and at least one of butadiene, ethylene-butylene, isoprene and ethylene-propylene.

9. A composite hollow fiber membrane as claimed in claims 1 or 2, wherein the porous substrate layers comprise polyethylene, polypropylene, poly(4-methylpentene-1), poly(vinylidene fluoride) or polyoxymethylene.

10. A composite hollow fiber membrane as claimed in claim 9, wherein the homogeneous thin film comprises a copolymer of (2,2-bistrifluoromethyl-4,5-difluoro-1,3-dioxole) and tetrafluoroethylene, low crystalline poly(4-methylpentene-1), a polymer blend composed of a styrene-based thermoplastic elastomer and a polyolefin, a fluorine-containing thermoplastic elastomer, or a polyolefin-based thermoplastic elastomer.

11. A composite hollow fiber membrane as claimed in claim 9, wherein the homogeneous thin film comprises a polymer blend composed of a polyolefin having a density of not greater than 0.900 g/cm$^3$ and a styrene-based thermoplastic elastomer selected from a block copolymer composed of polystyrene segments and segments formed from at least one monomer selected from butadiene, ethylene-butylene, isoprene and ethylene-propylene, and a random copolymer composed of styrene and at least one of butadiene, ethylene-butylene, isoprene and ethylene-propylene.

12. A composite hollow fiber membrane as claimed in claims 1 or 2, wherein the homogeneous thin film comprises a copolymer of (2,2-bistrifluoromethyl-4,5-difluoro-1,3-dioxole) and tetrafluoroethylene, low-crystalline poly(4-methylpentene-1), a polymer blend composed of a styrene-based thermoplastic elastomer and a polyolefin, a fluorine-containing thermoplastic elastomer, or a polyolefin-based thermoplastic elastomer.

13. A composite hollow fiber membrane as claimed in claims 1 or 2, wherein the homogeneous thin film comprises a polymer blend composed of a polyolefin having a density of not greater than 0.900 g/cm$^3$ and a styrene-based thermoplastic elastomer selected from a block copolymer composed of polystyrene segments and segments formed from at least one monomer selected from butadiene, ethylene-butylene, isoprene and ethylene-propylene, and a random copolymer composed of styrene and at least one of butadiene, ethylene-butylene, isoprene and ethylene-propylene.

* * * * *